United States Patent
Winfield et al.

(10) Patent No.: US 10,528,938 B2
(45) Date of Patent: Jan. 7, 2020

(54) SYSTEM AND METHOD FOR LOADING PREPAID CARD WITH FUNDS USING A MOBILE DEVICE

(71) Applicant: CardLab, Inc., Addison, TX (US)

(72) Inventors: Brian Winfield, Addison, TX (US); David S. Jones, Addison, TX (US)

(73) Assignee: CardLab, Inc., Addison, TX (US)

( * ) Notice: Subject to any disclaimer, the term of this patent is extended or adjusted under 35 U.S.C. 154(b) by 1115 days.

(21) Appl. No.: 14/280,546

(22) Filed: May 16, 2014

(65) Prior Publication Data

US 2015/0332247 A1    Nov. 19, 2015

(51) Int. Cl.
  *G06Q 40/00* (2012.01)
  *G06Q 20/32* (2012.01)
  *G06Q 20/34* (2012.01)
  *G06Q 20/36* (2012.01)

(52) U.S. Cl.
  CPC ......... *G06Q 20/32* (2013.01); *G06Q 20/3223* (2013.01); *G06Q 20/3224* (2013.01); *G06Q 20/342* (2013.01); *G06Q 20/349* (2013.01); *G06Q 20/354* (2013.01); *G06Q 20/3552* (2013.01); *G06Q 20/3672* (2013.01)

(58) Field of Classification Search
  CPC .............. G06Q 40/00; G06Q 20/00
  USPC .......................................... 705/41
  See application file for complete search history.

(56) References Cited

U.S. PATENT DOCUMENTS

| 7,729,986 B1 * | 6/2010 | Hoffman | G06Q 20/04 705/41 |
| 2014/0244496 A1 * | 8/2014 | Langus | G06Q 20/3674 705/41 |

* cited by examiner

*Primary Examiner* — Ojo O Oyebisi
(74) *Attorney, Agent, or Firm* — Wick Phillips Gould & Martin LLP; Jerry C. Harris, Jr.

(57) ABSTRACT

A system for loading a prepaid card using a mobile device, the mobile device comprising a unique identifier stored in a data memory device of the mobile device, a card reader coupled to the mobile device, the card reader configured to read data from a data memory device of the prepaid card, a remote card loading system operating on the mobile device and configured to receive the prepaid card data from the card reader and to transmit the unique identifier, prepaid card value data and prepaid card activation data to a prepaid card management system and a loader authorization system operating on a processor and configured to receive the mobile device identification data, the prepaid card value data and the prepaid card activation data and to activate the prepaid card for use with a financial transaction processing system.

10 Claims, 2 Drawing Sheets

SYSTEM AND METHOD FOR LOADING PREPAID CARD WITH FUNDS USING A MOBILE DEVICE

TECHNICAL FIELD

The present disclosure relates generally to loading a prepaid card with funds, and more specifically to a system and method for loading a prepaid card with funds using a mobile device.

BACKGROUND OF THE INVENTION

Prepaid or stored value cards are payment instruments with a stored amount of money associated with the card. While such cards can be loaded from a remote location, the device used to load the card must be fixed and associated with that predetermined location, in order to prevent fraud.

SUMMARY OF THE INVENTION

A system for loading a prepaid card using a mobile device is disclosed, where the mobile device includes a unique identifier stored in a data memory device of the mobile device. A card reader is connected to the mobile device and is configured to read data from a data memory device of the prepaid card. A remote card loading system operating on the mobile device is configured to receive the prepaid card data from the card reader and to transmit the unique identifier, prepaid card value data and prepaid card activation data to a prepaid card management system. A loader authorization system operating on a processor is configured to receive the mobile device identification data, the prepaid card value data and the prepaid card activation data and to activate the prepaid card for use with a financial transaction processing system.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views, and in which.

DETAILED DESCRIPTION OF THE INVENTION

Figure 1:
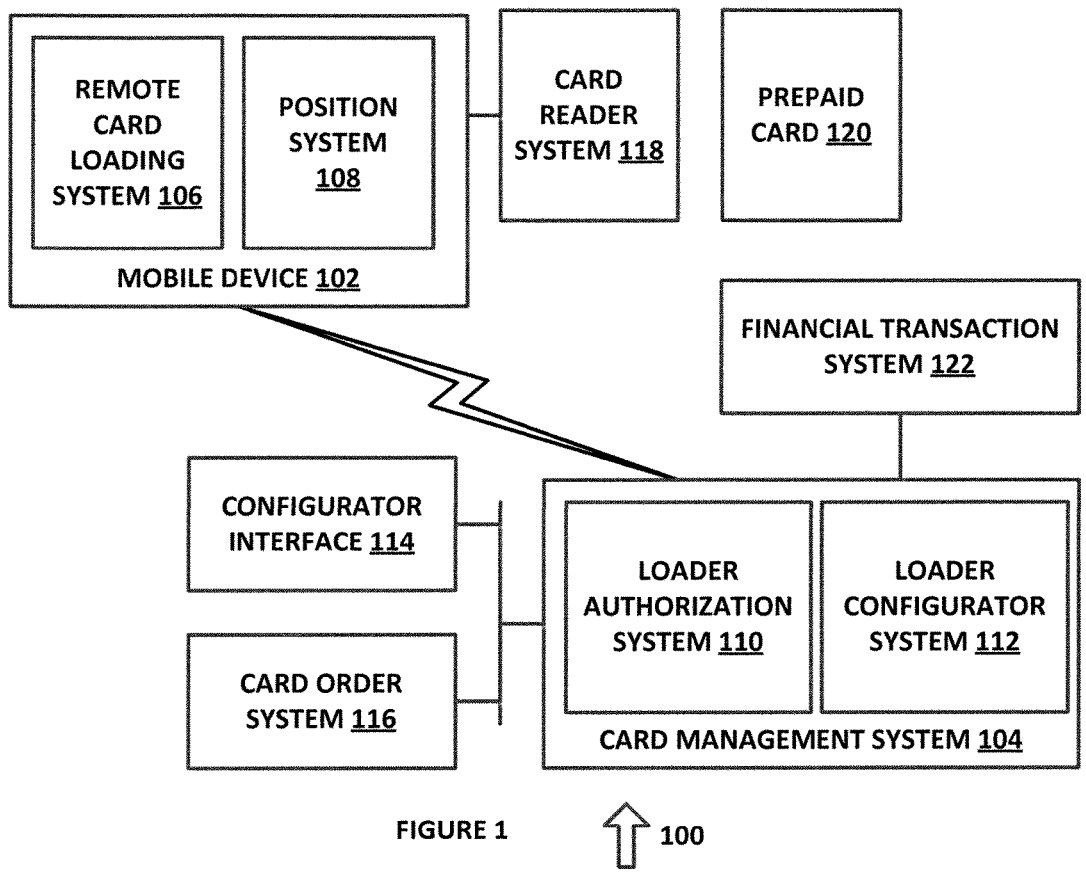
FIG. 1 is a diagram of a system 100 for mobile loading of prepaid cards with funds in accordance with an exemplary embodiment of the present disclosure.

In the description that follows, like parts are marked throughout the specification and drawings with the same reference numerals. The drawing figures might not be to scale and certain components can be shown in generalized or schematic form and identified by commercial designations in the interest of clarity and conciseness.

FIG. 1 is a diagram of a system 100 for mobile loading of prepaid cards with funds in accordance with an exemplary embodiment of the present disclosure. System 100 includes mobile device 102 which includes remote card loading system 106 and position system 108, card management system 104 which includes loader authorization system 110 and loader configuration system 112, configurator interface 114, card order system 116, card reader system 118. Prepaid card 120 and financial transaction system 122, each of which can be implemented in hardware or a suitable combination of hardware and software, and which can be one or more software systems operating on one or more processors.

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes a microcomputer or other suitable controller, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections.

Mobile device 102 can be a smartphone, a tablet computer or other suitable mobile devices that are configured to operate in conjunction with remote card loading system 106 and position system 108. In one exemplary embodiment, remote card loading system 106 can be implemented as a software application operating on mobile device 102 that is configured to interface with card reader system 118, which can be a magnetic stripe card reader, a near field communication (NFC) device card reader, a wireless device reader, an optical device reader or other suitable card readers or devices. Position system 108 can be a global positioning system device, can interface with a position detecting device, can receive position data as a function of signal timing data with one or more signal sources or can otherwise generate position data. In this exemplary embodiment, remote card loading system 106 can extract a mobile device identifier such as a unique device identifier (UDID), a mobile identification number (MIN), a mobile subscription identification number (MSIN), an International Mobile Subscriber Identity (IMSI) or other suitable identifiers that uniquely identify a mobile device. Remote card loading system 106 can also receive identification data from card reader system 118 or other suitable devices, such as data encoded on a magnetic stripe, data encoded in an NFC device, data encoded in a wireless device, data encoded in an optical device, as well as location data from position system 108, and can assemble the data for transmission to card management system 104 or other suitable locations. In one exemplary embodiment, the data can be assembled into predetermined data locations within one or more packet data structures, the data packet can be encrypted and/or converted into a wireless data transmission packet or frame, the wireless data transmission packet or frame can be modulated onto a wireless signal, or other suitable processes can also or alternatively be used. Remote card loading system 106 can also receive data from card management system 104 or other suitable locations, and can use the received data to configure the prepaid card or other suitable devices, can generate a user interface to notify a user that a card has been loaded, or other suitable processes can also or alternatively be used.

Card management system 104 can interface with configurator interface 114 and mobile device 102 to allow a user to configure mobile device 102 to operate as a prepaid card loading system, and also to interface with mobile device 102 after it has been configured to load prepaid cards. In one exemplary embodiment, loader configuration system 112 can interface with configurator interface 114, such as by generating a user interface in a web browser using HTML, by interfacing with a software application operating on configurator interface 114 or in other suitable manners, and generates one or more user controls that allow a user to enter or select a device identifier, to enter or select an approved area of use, to enter or select an approved maximum amount to be loaded, to enter or select prepaid card identifiers or other suitable identifiers to be associated with a mobile device for loading, or for other suitable purposes.

Card order system 116 generates one or more user controls to allow a user to order prepaid cards for use in conjunction with remote card loading system 106. In one exemplary embodiment, card order system 116 can cause a manufacturing device to include an indicator on prepaid cards that have been ordered for use in conjunction with remote card loading system 116, where the indicator can be used to verify that the prepaid cards are associated with the location where they are being loaded. In this exemplary embodiment, the prepaid cards can include a retail establishment name, a code, data stored on a data memory device or other suitable data that can be used to identify the retail location where the prepaid cards are to be used, such as in conjunction with retail establishment identification data associated with a location, a wireless beacon or other suitable data. In this manner, additional security can be provided to prevent a prepaid card from being loaded at a location other than an authorized location, by manufacturing the prepaid card with additional security information that is unique to the location where the prepaid card will be used.

Card reader system 118 is coupled to mobile device 102, such as through a USB slot or data port, or can be installed within mobile device 102, such as where prepaid card 120 uses a near field communication (NFC) device or other suitable data storage devices. Card reader system 118 can read a data storage device of prepaid card 120, such as a magnetic stripe, a NFC device or other suitable data storage devices, including card identification data, authorized location data, or other suitable data that is stored in one or more predetermined data fields within the data storage device. In one exemplary embodiment, card reader 118 can also write predetermined data on prepaid card 120, such as to overwrite a card identifier with an alert code.

Financial transaction system 122 includes one or more card reader devices, point of sale terminals and other suitable components that are configured to allow prepaid card 120 to be used for a financial transaction. In one exemplary embodiment, when prepaid card 120 is presented for payment, data is read from one or more data fields of a data memory device of prepaid card 120, and is included in a data packet that includes a purchase amount, a terminal identifier or other suitable data. That data is transmitted directly or indirectly to card management system 104, which authorizes a transaction for some or all of the amount of funds associated with prepaid card 120. Alternatively, the amount of funds can be provided from a data field in a data storage device of prepaid card 120, data can be provided that identifies prepaid card 120 as having been associated with a fraudulent transaction, or other suitable data can also or alternatively be provided or extracted from a database associated with card management system 104.

In operation, system 100 allows a user to order prepaid cards that can be loaded with a mobile device, such as to allow a manager, a salesperson, a marketing agent or other suitable personnel to provide prepaid cards to employees, customers or other persons in conjunction with a performance award, a customer incentive, a marketing event or for other suitable purposes. System 100 thus allows prepaid cards to be used more effectively, by allowing them to be provided to persons where those persons might be working or shopping, and without requiring those persons to wait in line for the prepaid card, for the prepaid card to be configured and loaded with funds.

Figure 2:
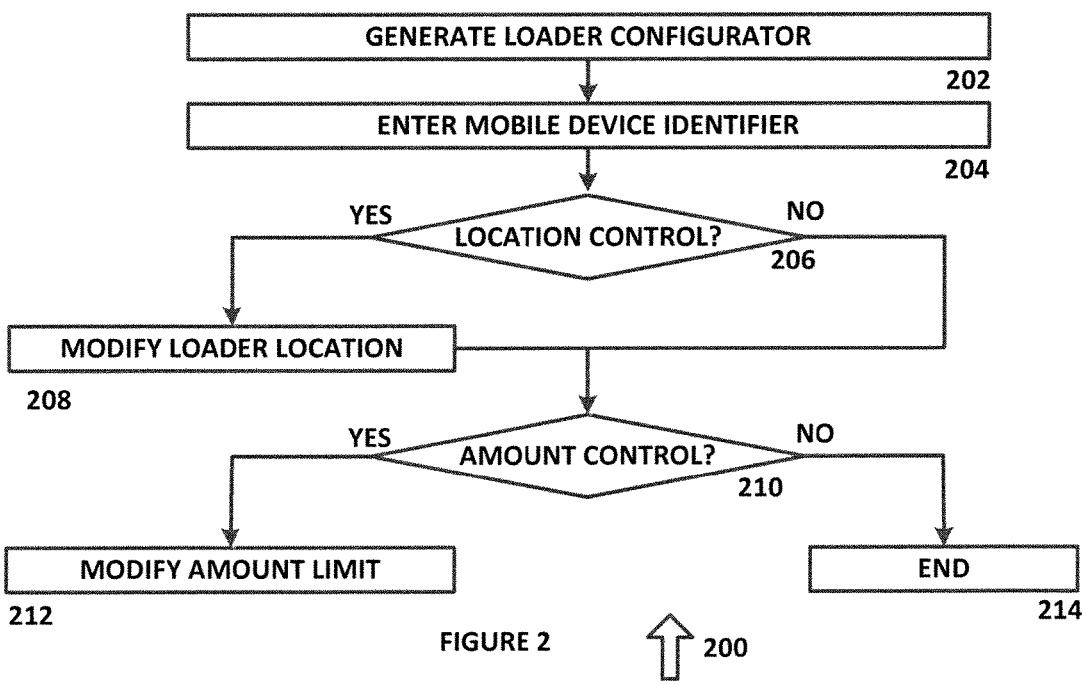
FIG. 2 is a diagram of an algorithm 200 for configuring a loader in accordance with an exemplary embodiment of the present disclosure.

FIG. 2 is a diagram of an algorithm 200 for configuring a loader in accordance with an exemplary embodiment of the present disclosure. Algorithm 200 can be implemented in hardware or a suitable combination of hardware and software, and can be one or more software systems operating on one or more processors.

Algorithm 200 begins at 202, where a loader configurator control is generated. In one exemplary embodiment the loader configurator control can include one or more objects, each having associated text, functional and graphical attributes that are associated with one or more controls in a user interface, such as in a web browser, a software application or other suitable controls. The algorithm then proceeds to 204.

At 204, a mobile device identifier is entered, such as by generating a user control that prompts the user to enter the mobile device identifier, by reading the mobile device identifier or in other suitable manners. One or more data fields of a data storage device are then modified to store the mobile device identifier in the data storage device, and the algorithm then proceeds to 206.

At 206, control data received from a user control is analyzed to determine whether a location control should be associated with the mobile device identifier. In one exemplary embodiment, the user control can allow a user to select a map or other selection tool, such as by entering a zip code, by entering a wireless beacon identifier/address, by selecting one or more items or areas on a map or in other suitable manners. If it is determined at 206 that a location control has not been activated, the algorithm proceeds to 210, otherwise the algorithm proceeds to 208 where a loader location is modified, such as to modify one or more data fields of a data storage device to store the location data in the data storage device and to associate the location data with the mobile device identifier data, such as by entering a zip code, a wireless beacon identifier, by selecting a geographical area on a map or in other suitable manners, and the algorithm then proceeds to 210.

At 210, control data received from a user control is analyzed to determine whether an amount control should be associated with the mobile device identifier. In one exemplary embodiment, the user control can allow a user to select an amount or other selection tool, such as by entering a maximum amount, by selecting one or more amounts from a drop-down list or in other suitable manners. If it is determined at 210 that an amount control has not been activated, the algorithm proceeds to 214 and ends, otherwise the algorithm proceeds to 212 where a loader amount is modified, such as to modify one or more data fields of a data storage device to store the amount data in the data storage device and to associate the amount data with the mobile device identifier data, and the algorithm then proceeds to 214 and terminates.

In operation, algorithm 200 allows a wireless prepaid card loader to be configured for use in different physical locations, so as to prevent the loader from being used to load a prepaid card in a location where the user is not authorized to be. Algorithm 200 also allows an amount of funds that a loader can be used to load onto a prepaid card to be specified, and can provide other suitable security features.

Figure 3:
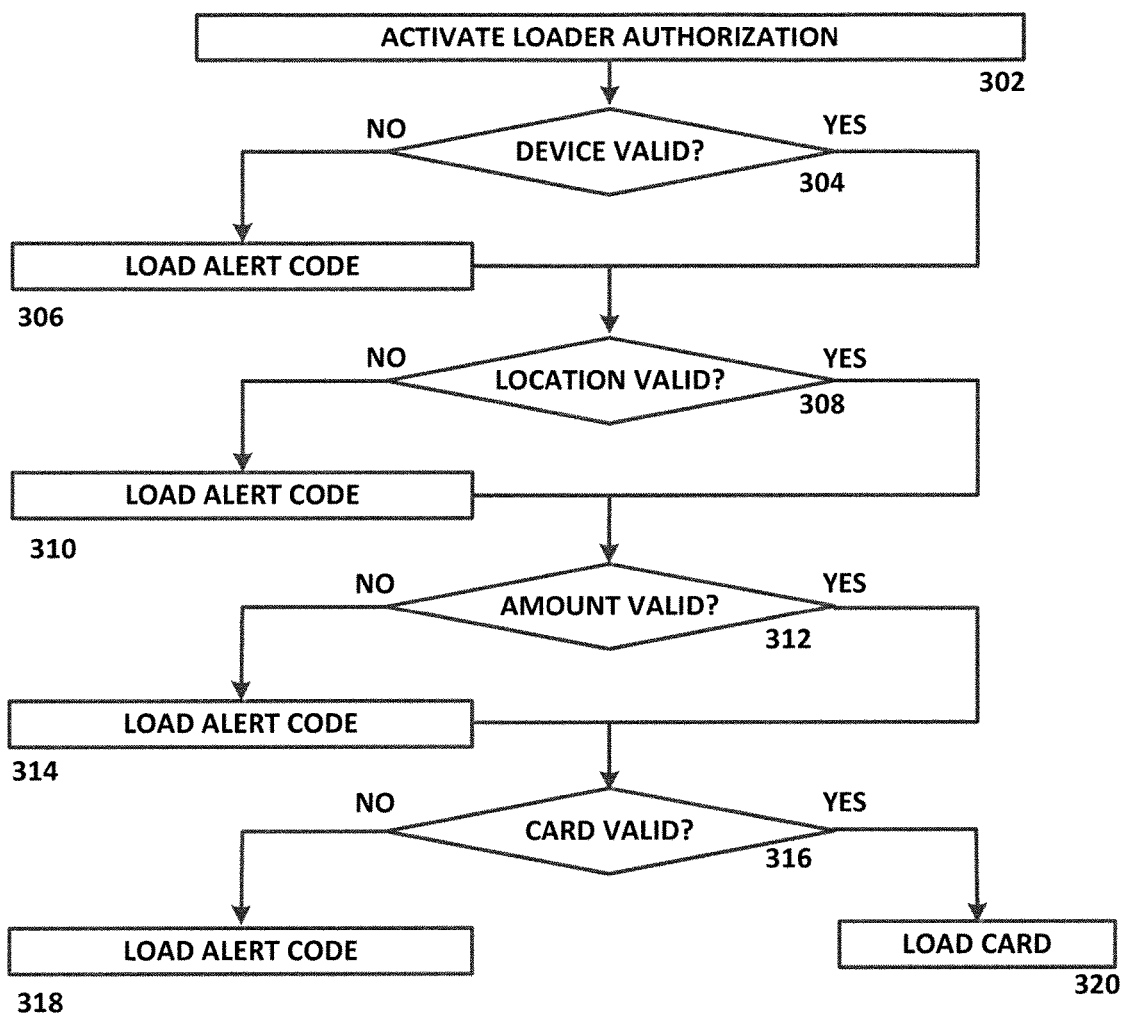
FIG. 3 is a diagram of an algorithm 300 for using a mobile loader in accordance with an exemplary embodiment of the present disclosure.

FIG. 3 is a diagram of an algorithm 300 for using a mobile loader in accordance with an exemplary embodiment of the present disclosure. Algorithm 300 can be implemented in hardware or a suitable combination of hardware and software, and can be one or more software systems operating on one or more processors.

Algorithm 300 begins at 302, where a loader authorization control is activated. In one exemplary embodiment the loader authorization control can include one or more objects, each having associated text and functional attributes or other suitable controls, and can be activated upon receipt of a data packet containing predetermined loader authorization control activation data, such as one or more predetermined data fields. The algorithm then proceeds to 304.

At 304, it is determined whether a mobile device requesting loader authorization is valid, such as by activating a processing routine to verify that a mobile device identifier contained in one or more data fields of a data packet received at a loader authorization system contains one or more data fields that match one or more stored data fields, by sending a request packet or other suitable data to interrogate a wireless device that originated the data packet received at 302 to return a mobile device identifier or other suitable identifier data, or in other suitable manners. If it is determined that the device is valid at 304, the algorithm proceeds to 308, otherwise the algorithm proceeds to 306 where an alert code is loaded. In one exemplary embodiment, the alert code can include a code that is stored on a magnetic stripe of a prepaid card, in an associated data memory or in other suitable devices or locations that causes the card to be flagged if it is presented for use. For example, if a loader has been misappropriated and is being used in an unauthorized location, then it might be impossible to dispatch authorities to that location before the user leaves, but any prepaid cards that are loaded can be inhibited to prevent subsequent use while generating an indication that the load onto the prepaid card was successful. In this manner, when the user tries to use that prepaid card, an alert can be generated to allow the clerk to confiscate the card and report the user to authorities. Likewise, other suitable notifications can also or alternatively be provided, such as to notify authorities of a location or wireless access point where the misappropriated loader is being used. The algorithm then proceeds to 308.

At 308, it is determined whether a location for the mobile device that is requesting loader authorization is valid, such as by activating a processing routine to verify that location data received from the mobile device that is contained in one or more data fields of a data packet received at a loader authorization system contains one or more data fields that match one or more stored data fields, by sending a request packet or other suitable data to interrogate a wireless device that originated the data packet received at 302 to return location data or other suitable data, or in other suitable manners. If it is determined that the location is valid at 308, the algorithm proceeds to 312, otherwise the algorithm proceeds to 310 where an alert code is loaded. In one exemplary embodiment, the alert code can include a code that is stored on a magnetic stripe of a prepaid card, in an associated data memory or in other suitable devices or locations that causes the card to be flagged if it is presented for use. Likewise, other suitable notifications can also or alternatively be provided, such as to notify authorities of a location or wireless access point where the misappropriated loader is being used, to send a notification to an employer that an employee is using a loader outside of a valid area, or other suitable data. The algorithm then proceeds to 312.

At 312, it is determined whether an amount for the mobile device that is requesting loader authorization is valid, such as by activating a processing routine to verify that amount data received from the mobile device that is contained in one or more data fields of a data packet received at a loader authorization system contains one or more data fields that match one or more stored data fields, by sending a request packet or other suitable data to interrogate a wireless device that originated the data packet received at 302 to return amount data or other suitable data, or in other suitable manners. If it is determined that the amount is valid at 312, the algorithm proceeds to 316, otherwise the algorithm proceeds to 314 where an alert code is loaded. In one exemplary embodiment, the alert code can include a code that is stored on a magnetic stripe of a prepaid card, in an associated data memory or in other suitable devices or locations that causes the card to be flagged if it is presented for use. Likewise, other suitable notifications can also or alternatively be provided, such as to notify authorities of a location or wireless access point where the misappropriated loader is being used, to send a notification to an employer that an employee is trying to load more than an allowed amount of funds, or other suitable data.

At 316, it is determined whether a card for which the mobile device is requesting loader authorization is valid, such as by activating a processing routine to verify that the card was ordered for the location at which it is being loaded or in other suitable manners. In one exemplary embodiment, a card can be ordered using an online process, where the location at which the card it to be used is specified. In addition, one or more identifiers can be provided on the card to indicate the approved location, such as a watermark, a logo, a code or other suitable location identifiers. The location data can be validated using data read from a data storage device of the card, image data of the card, or other suitable data. If it is determined that the location data associated with the card when it was ordered matches the location data where the card is being used, the algorithm proceeds to 320, otherwise the algorithm proceeds to 318 where an alert code is loaded. In one exemplary embodiment, the alert code can include a code that is stored on a magnetic stripe of a prepaid card, in an associated data memory or in other suitable devices or locations that causes the card to be flagged if it is presented for use. Likewise, other suitable notifications can also or alternatively be provided, such as to notify authorities of a location or wireless access point where the misappropriated loader is being used, to send a notification to an employer that an employee is trying to load unauthorized cards at an authorized location, or other suitable data.

At 320, the prepaid card is loaded with the identified amount of funds. In one exemplary embodiment, the amount of funds can be identified in a database of a card management system, where use of the prepaid card is performed by accessing the database and adjusting the amount, or in other suitable manners. In another exemplary embodiment, the funds can be loaded by modifying one or more data fields of a data storage device on the card or in other suitable manners.

In operation, algorithm 300 allows a wireless prepaid card loader to be used to authorize the loading of funds onto a prepaid card in different physical locations, so as to prevent the loader from being used to load a prepaid card in a location where the user is not authorized to be. Algorithm 300 also allows an amount of funds that a loader can be used to load onto a prepaid card to be specified, and can provide other suitable security features.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A method for loading a prepaid card using a mobile device, comprising:
   receiving prepaid card identification data from a data memory device of the prepaid card at a processor;
   receiving a unique identifier from the data memory device of the mobile device at the processor, wherein the mobile device comprises a remote card loading system application which configures the mobile device to transmit the unique identifier;
   determining with the processor whether the prepaid card identification data and the unique identifier correspond to stored profile data for prepaid card authorization;
   receiving position data from the mobile device;
   determining whether the position data correlates to stored location data; and
   transmitting an authorization code to the mobile device to use the prepaid card for financial transactions if the prepaid card identification data and the unique identifier correspond to stored profile data for prepaid card authorization and the position data correlates to stored location data.

2. The method of claim 1 further comprising:
   receiving user-entered data that identifies the mobile device; and
   storing the user-entered data prior to receiving the unique identifier.

3. The method of claim 1 further comprising generating one or more user controls to allow a user to specify one or more prepaid card loading parameters for a mobile device.

4. The method of claim 1 further comprising generating one or more user controls to allow a user to identify a location associated with the prepaid card that is stored on the prepaid card.

5. The method of claim 1 further comprising:
   receiving prepaid card order data at the processor that includes authorized location data for storing on a plurality of ordered prepaid cards; and
   manufacturing the plurality of ordered prepaid cards to include the authorized location data.

6. The method of claim 5 further comprising:
   receiving image data from the prepaid card; and
   determining whether the authorized location data is located within the image data.

7. The method of claim 5 further comprising:
   receiving one or more fields from a data memory device of the prepaid card; and
   determining whether the authorized location data is located within the one or more fields.

8. The method of claim 1 wherein the stored location data comprises wireless beacon identifier data.

9. The method of claim 1 further comprising transmitting an alert code to the mobile device to modify a data field of the data storage device of the prepaid card that causes an alert to be generated when the prepaid card is used for a financial transaction.

10. In a system for loading a prepaid card using a mobile device, the mobile device having a unique identifier stored in a data memory device of the mobile device, a card reader coupled to the mobile device, the card reader configured to read data from a data memory device of the prepaid card, the mobile device comprising a remote card loading system application which configures the mobile device to receive the prepaid card data from the card reader and to transmit the unique identifier, prepaid card value data and prepaid card activation data to a prepaid card management system, a loader authorization system operating on a processor and configured to receive the mobile device identification data, the prepaid card value data and the prepaid card activation data and to activate the prepaid card for use with a financial transaction processing system, a position system generating position data, wherein the mobile device comprising the remote card loading system application is configured to transmit the position data in conjunction with the unique identifier, the prepaid card value data and the prepaid card activation data, a loader configurator system configured to receive user-entered data that identifies the mobile device and to authorize the mobile device to load funds on the prepaid card, a configurator interface operating on the processor remote from the loader authorization system and configured to generate one or more user controls to allow a user to specify one or more prepaid card loading parameters for a mobile device, a card order system configured to generate one or more user controls to allow a user to identify a location associated with the prepaid card that is stored on the prepaid card, wherein the card reader system is configured to read the location from the prepaid card and the loader authorization system is configured to determine whether the location from the prepaid card is associated with the position data, a method comprising:
   receiving prepaid card identification data from the data memory device of the prepaid card at the processor;
   receiving a unique identifier from the data memory device of the mobile device at the processor;
   determining with the processor whether the prepaid card identification data and the unique identifier correspond to stored profile data for the prepaid card authorization; and
   transmitting an authorization code to the mobile device to use the prepaid card for financial transactions if the prepaid card identification data and the unique identifier correspond to the stored profile data for the prepaid card authorization;

receiving the position data from the mobile device; and determining whether the position data correlates to the stored location data;

receiving the user-entered data that identifies the mobile device;

storing the user-entered data prior to receiving the unique identifier;

generating one or more user controls to allow a user to specify one or more prepaid card loading parameters for a mobile device;

generating one or more user controls to allow a user to identify a location associated with the prepaid card that is stored on the prepaid card;

reading the location from the prepaid card;

determining whether the location from the prepaid card is associated with the position data;

receiving prepaid card order data at the processor that includes authorized location data for storing on a plurality of ordered prepaid cards;

manufacturing the plurality of ordered prepaid cards to include the authorized location data;

receiving image data from the prepaid card;

determining whether the authorized location data is located within the image data;

receiving one or more fields from a data memory device of the prepaid card;

determining whether the authorized location data is located within the one or more fields;

transmitting an alert code to the mobile device to modify a data field of the data storage device of the prepaid card that causes an alert to be generated when the prepaid card is used for a financial transaction; and wherein the stored location data comprises wireless beacon identifier data.

* * * * *